Sept. 21, 1948.  C. WYSS  2,449,735
IRRIGATION PIPE COUPLING
Filed April 16, 1946  2 Sheets-Sheet 1
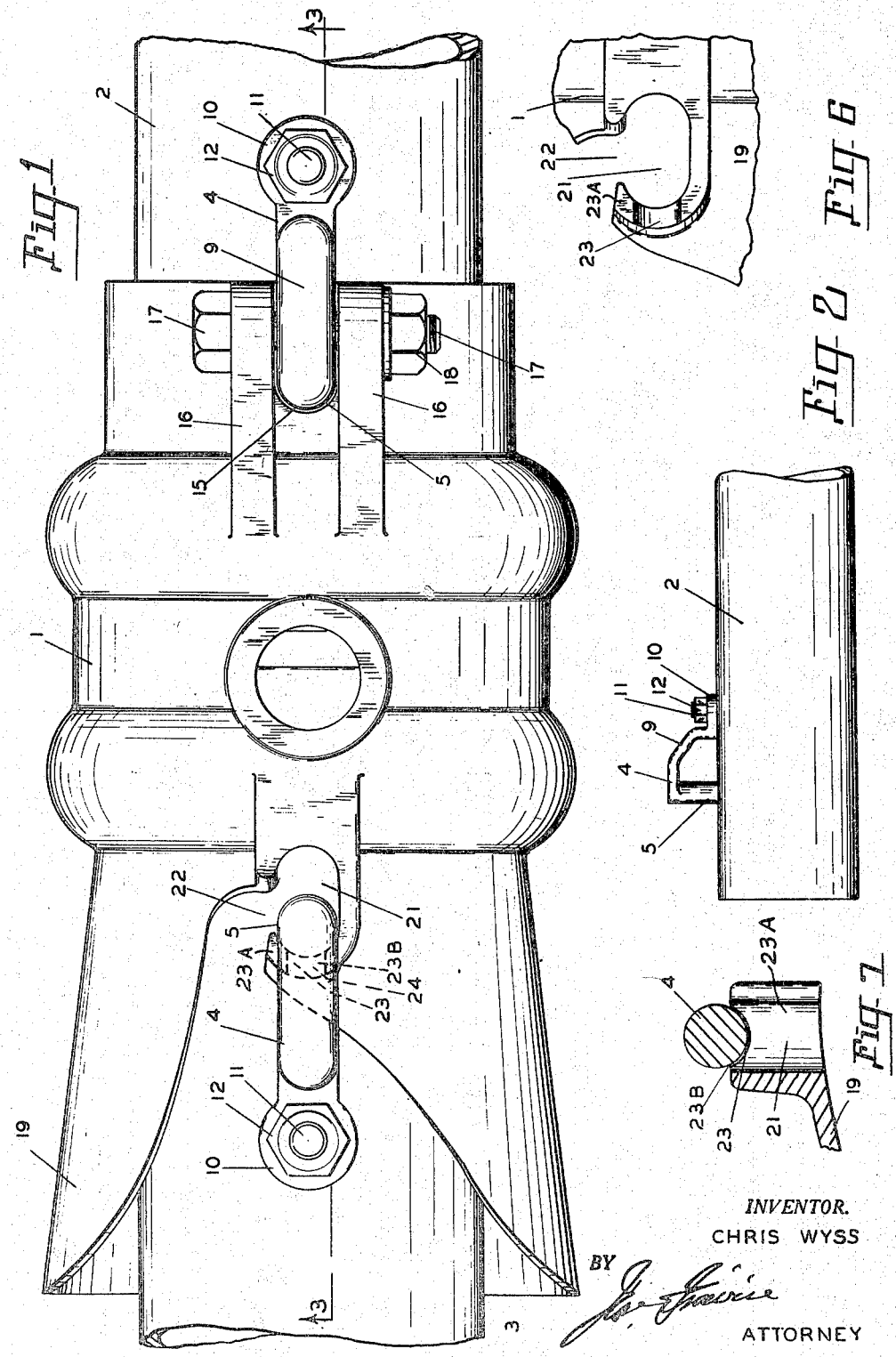
INVENTOR.
CHRIS WYSS
BY
ATTORNEY Sept. 21, 1948.  C. WYSS  2,449,735
IRRIGATION PIPE COUPLING
Filed April 16, 1946  2 Sheets-Sheet 2
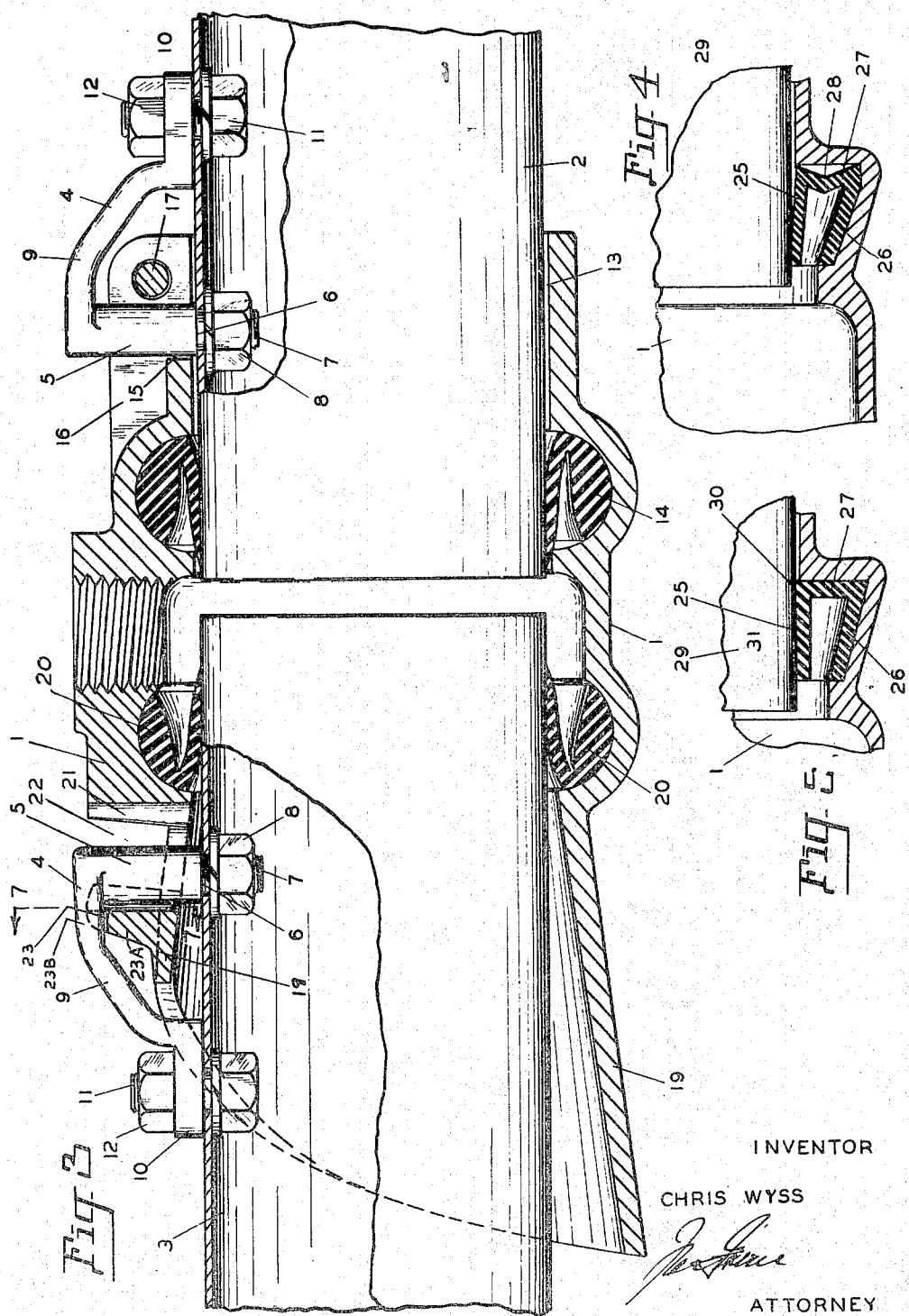
INVENTOR
CHRIS WYSS
ATTORNEY Patented Sept. 21, 1948

2,449,735

UNITED STATES PATENT OFFICE 2,449,735

IRRIGATION PIPE COUPLING

Chris Wyss, Tillamook, Oreg.

Application April 16, 1946, Serial No. 662,443

4 Claims. (Cl. 285—175)

This invention relates to pipe joints and is particularly adapted for the joining together of irrigation piping.

The primary object of the invention is to provide a means of locking the pipe within the joints provided for holding the pipes together.

Present day pipes for irrigation systems are being made from light material, as for instance aluminum and one of the primary objects of my invention is to provide means for locking these pipes to couplings or joints without welding the locking mechanism to the pipe, therefore I have provided a special fitting to be attached to the end of the pipes that will not bend or injure the present day thin wall piping.

A still further object of my new pipe coupling is to allow for expansion and contraction of the pipe line at the coupling by providing a locking mechanism that will allow for end movement of the pipe without unlocking the connection.

These and other incidental objects will be apparent in the drawings, specifications and claims.

Referring to the drawings:

Figure 1 is a plan view of my new and improved irrigation pipe coupler or joint.

Figure 2 illustrates the fitting connected with the pipe for locking the pipe to the joint or coupling.

Figure 3 is a side sectional view of the coupling, parts broken away for convenience of illustration, the same illustrating how the coupling and pipes are held together and sealed.

Figure 4 is a fragmentary sectional view of another improved method of sealing the pipe within the coupler, the same being illustrated before any water pressure is applied to the system.

Figure 5 is the same as Figure 4 except that it is assumed that water pressure is being applied to the seal.

Figure 6 is a fragmentary plan view of the locking slot of an interlocking trough associated therewith.

Figure 7 is a fragmentary sectional view taken on line 7—7 of Figure 3.

In the drawings:

My new and improved coupler or joint is indicated by numeral 1, having pipes 2 and 3 locked therein. Special fittings 4 consisting of an outwardly extending locking pin 5, the pin 5 has a shoulder 6 for contacting the outer surface of the pipe extending beyond, this shoulder is the threaded portion 7 upon which is threaded the locking nut 8 for holding the pin 5 to the pipe. Due to the thin wall construction of aluminum piping it becomes necessary to brace the pin 5, which is accomplished by the brace 9 connecting the upper part of the pin 5 with the foot 10, which is bolted to the pipe by the bolt 11 and locking nut 12.

The pipe 2 is connected to the coupling 1 by inserting the same into the opening or neck 13, thence through the well known water seal gasket 14. The pipe is held in this position by the registering of the pin 5 with the slot 15 formed between the bosses or brackets 16. A cross bolt 17 is then inserted through the boss and held therein by the locking nut 18. The bosses 16 prevent the pipe from turning, holding it in the desired position while the cross bolt 17 prevents the removal of the pipe due to its preventing the locking pin 5 from being withdrawn from the slot 15.

Each pipe ordinarily has a coupling mounted thereon as above described. In order to connect the pipe 3, the same is inserted within the flared skirt 19, which is covered by a former patent of mine. The pipe 3 is locked in position within the water seal unit 20 by the pin 5 passing through the opening 22 and into the slot 21. A trough 23 is formed longitudinal of the coupling on the upper surface of the outer end 23A of the slot 21 for receiving the horizontal portion 23B of the brace 9 when the outer end of the pipe 3 is lowered. This trough prevents the pipe from rotating about its axis thereby preventing the locking pin from leaving the slot 21 through the opening 22.

When it is desired to disengage the joint the outer end of the pipe is raised lifting the portion 23B of the brace 9 out of the trough 23 permitting the pipe to be rotated and allowing the locking pin 5 to pass out through the opening 22 in the side of the slot 21 permitting the removal of the pipe from the joint. With this construction of interlocking the locking pin within the slot 21 any desired end movement caused by expansion and contraction is provided for within the joint, and this is one of the primary objects of my invention.

It will be noted that the locking pins, including their complete assembly are mounted to the pipes so that the pipes can be reversed or interchanged to either side of the coupling. I have provided a new and improved water seal, referring to Figures 4 and 5 it will be noted that the seal is of double construction having an inner wall 25 and an outer wall 26 connected together by an end wall 27. Referring to Figure 4, the seal is cast in the shape illustrated, the end wall 27 kinked inward at 28 which pulls the inner wall 25 away from the pipe 29 while the pipe is being inserted, thereby allowing free movement of the pipe in to the coupling.

When the water pressure is brought into the system the kink 28 will be forced out on the end wall 27, bringing the same to the position shown in Figure 5, forcing the inner wall 25 of the seal tightly against the pipe at 30, which assists the portion 31 or seal to maintain a water seal. By using this type of seal the feathering of the inner wall 25 is eliminated, also a more free entry and removal of the pipe is provided, still having a complete seal against the inner wall of the seal.

I do not wish to be limited to the exact mechanical structure as other mechanical equivalents may be substituted still coming within the scope of my claims.

What I claim as new is:

1. A pipe coupling comprising in combination, a coupling member, a pipe end to be coupled therewith and having an outstanding pin secured adjacent its end, said coupling member being formed to receive a pipe end and having a slot for receiving the outstanding pin on the pipe end and including a locking member extending across said slot for retaining the pipe pin in said slot, said pipe pin including a brace portion extending angularly therefrom and being secured to said pipe in spaced relation from the pin proper to brace the pin relative to the pipe wall and prevent deformation of said pipe wall, said brace portion being positioned to overlie said locking member to secure said pin in said slot against accidental displacement therefrom.

2. A pipe coupling comprising in combination, a coupling member, a pipe end to be coupled therewith and having an outstanding pin secured adjacent its end, said coupling member being formed to receive a pipe end and having a bayonet slot for receiving the outstanding pin on the pipe end and including a longitudinally extending portion to permit longitudinal movement of said pin, a locking member extending across the longitudinal portion of said slot for retaining the pipe pin in said slot, said pipe pin including a brace portion extending angularly therefrom and to overlie said locking member, said brace portion being secured to said pipe in spaced relation from the pin proper to brace the pin relative to the pipe wall and prevent deformation of said pipe wall, said locking member having a height greater than the position of said brace portion and being troughed to receive said brace portion to secure said pin in said slot against accidental displacement therefrom and to accommodate the longitudinal movement of said pin.

3. A pipe coupling, comprising in combination, a coupling member, pipe ends to be coupled therewith, each having an outstanding pin secured adjacent its end, said coupling member being formed at each end to receive one of said pipe ends and having slots at each end for respectively receiving the outstanding pin on each of the pipe ends, said slots each including a locking member extending thereacross for retaining the respective pipe pin therein, said pipe pins including brace portions extending angularly therefrom and to overlie said locking members, said brace portions being secured to said pipes in spaced relation from the pin proper to brace the pins relative to the pipe walls and prevent deformation of said pipe walls and to secure said pin in said slots, one of said slots being a bayonet slot and including a longitudinally extending portion to permit longitudinal movement of said pin, the locking member for said bayonet slot extending across the longitudinal portion of said slot, said last mentioned locking member having a height greater than the position of said brace portions and being troughed to receive a brace portion to secure its pin in said bayonet slot against accidental displacement therefrom and to accommodate the longitudinal movement of said pin.

4. A pipe coupling, comprising in combination, a coupling member, pipe ends to be coupled therewith, each having an outstanding pin secured adjacent its end, said pipe pins including brace portions extending angularly therefrom and being secured to said pipes in spaced relation from said pins proper to brace the pins relative to the pipe walls and prevent deformation of the pipe walls, said coupling member being generally tubular in conformation with a sleeve at one end to slidingly receive and snugly support one of said pipe ends, said sleeve having a slot extending inwardly from its edge to receive the outstanding pin of the pipe end, said slot having outstanding side walls with a removably positioned lock member extending therebetween adjacent their outer ends and beneath said brace portion to lock the pipe pin within the slot, the other end of said coupling member being flared to freely receive the other of said pipe ends and having a bayonet slot extending inwardly from its edge to receive the pin on said pipe ends, said bayonet slot including a longitudinally extending portion to permit longitudinal movement of said pin, a locking member extending across the longitudinal portion of said bayonet slot and having a height greater than the position of the brace portions, said locking member having a trough in its upper surface to receive the brace portion of the pipe pin in the bayonet slot and to accommodate the longitudinal movement of the pin.

CHRIS WYSS.

REFERENCES CITED

The following references are of record in the file of this patent:

UNITED STATES PATENTS

| Number | Name | Date |
| --- | --- | --- |
| 2,087,916 | Lanninger | July 27, 1937 |
| 2,244,396 | Kellaher | June 3, 1941 |
| 2,290,403 | Wyss | July 21, 1942 |
| 2,327,570 | Wallis | Aug. 24, 1943 |
| 2,355,407 | Wyss | Aug. 8, 1944 |